United States Patent
Ohtsuka et al.

[11] Patent Number: 5,892,295
[45] Date of Patent: Apr. 6, 1999

[54] FUSE APPARATUS FOR A VEHICLE

[75] Inventors: Hitoshi Ohtsuka; Eiji Sakaguchi, both of Wako, Japan

[73] Assignee: Honda Giken Kogyo Kabushiki Kaisha, Tokyo, Japan

[21] Appl. No.: 961,477

[22] Filed: Oct. 31, 1997

[30] Foreign Application Priority Data

Nov. 5, 1996 [JP] Japan .................................. 8-292988

[51] Int. Cl.⁶ ...................................................... B60L 1/00
[52] U.S. Cl. ........................................................ 307/10.1
[58] Field of Search .................................. 307/9.1–10.8; 361/601, 622, 626, 627, 641, 642, 646, 647, 648, 730, 833–837; 439/76.2, 620–622; 200/52 R, 61.54, 56 R

[56] References Cited

U.S. PATENT DOCUMENTS

| | | | |
|---|---|---|---|
| 4,785,194 | 11/1988 | Gottlieb | 307/10.1 |
| 4,950,168 | 8/1990 | Watanabe et al. | 439/34 |
| 5,026,092 | 6/1991 | Abramczyk | 280/777 |
| 5,357,142 | 10/1994 | Kubota et al. | 361/629 |
| 5,556,305 | 9/1996 | Naegelin | 439/622 |
| 5,581,130 | 12/1996 | Boucheron | 307/10.1 |
| 5,596,233 | 1/1997 | Leiber et al. | 361/730 |
| 5,608,271 | 3/1997 | Saka et al. | 307/10.1 |
| 5,673,019 | 9/1997 | Dantoni | 200/61.3 |
| 5,756,949 | 5/1998 | Sato | 200/61.54 |
| 5,760,490 | 6/1998 | Yanase | 361/641 |

*Primary Examiner*—Richard T. Elms
*Attorney, Agent, or Firm*—Carrier, Blackman & Associates, P.C.; Joseph P. Carrier; William D. Blackman

[57] ABSTRACT

A fuse apparatus for a vehicle has a greatly reduced number of wire harnesses, particularly around a steering column where operational switches are concentrated and a fuse box where circuits are concentrated, for lowering the cost of the electrical system, making the electrical system small and light and mitigating assembling work thereof. The fuse apparatus comprises a fuse box provided on the steering column and having a fuse to be connected with an operational switch on the steering column, and a coupling terminal provided on the fuse box, connected with the fuse. The operational switch is directly attached to the fuse box with a coupling terminal of the switch coupled to the coupling switch on the fuse box whereby a wire harness conventionally provided between the fuse box and the operational switch is eliminated.

14 Claims, 3 Drawing Sheets

FUSE APPARATUS FOR A VEHICLE

BACKGROUND OF THE INVENTION

1. Field of the Invention

The present invention relates to a fuse apparatus for operational switches provided around a steering column of a vehicle.

2. Discussion of Relevant Art

Around the steering column are provided various operational switches for wipers, lighting, winker lamps etc. and an ignition switch disposed concentrically therewith. The operational switches are connected with the ignition switch through fuses and the ignition switch is connected with a battery through a main fuse.

FIG. 3 is a rough block diagram showing a wiring structure in such a conventional electrical system.

An ignition switch 02, a wiper switch 03, a lighting switch 04 and a winker switch 05 are attached to a steering column section 01. The wiper switch 03 is connected with a wiper motor 011 and a washer motor 012 through wire harnesses 030 to control their driving, the lighting switch 04 is connected with various lights, including head lights, through another wire harnesses 030 to control lighting, and the winker switch 05 is connected with a winker lamp 014 through another wire harness 030 to control lighting of the winker lamp.

Fuses interposed between the ignition switch and each of the operational switches 03, 04, 05 are gathered within a fuse box 010 and disposed under an instrument panel or the like. On the one hand, a battery 020 disposed within an engine compartment is connected with the ignition switch 02 through a main fuse 021.

The operational switches 03, 04, 05 on the steering column section 01 are connected with the fuse box 010 under the instrument panel through respective wire harnesses 031 and the ignition switch 02 is also connected with the fuse box 010 through a wire harness 032. Further, the ignition switch 02 is connected with the main fuse 021 through a wire harness 033. The fuse box 010 is also connected with the winker lamp 014 through a hazard switch 06 provided on the instrument panel or the like.

Since the steering column section 01 has many wire harnesses 030, 031, 032, 033 going in and out, assembling work therefor is troublesome and cost is high.

In advancing automobile electrical systems of recent years, the number of circuits and electric parts tend to increase, therefore, with the conventional construction of the electrical systems, the wire harnesses are enlarged more and more which causes problems such as high cost, increased weight and increased labor in the assembling work.

SUMMARY OF THE INVENTION

The present invention has been accomplished in view of the foregoing and it is an object of the present invention to provide a fuse apparatus for a vehicle in which a number of wire harnesses, particularly around a steering column where operational switches are concentrated and a fuse box where circuits are concentrated are reduced for lowering the cost of the electrical system, making the electrical system small and light weight, and mitigating assembling work thereof.

In order to achieve the above object, according to the present invention, there is provided a fuse apparatus for a vehicle, comprising a fuse box provided on a steering column and having a fuse to be connected with an operational switch on the steering column; and a coupling terminal provided on the fuse box, connected with the fuse, the operational switch being directly attached to the fuse box with a coupling terminal of the switch coupled to the coupling terminal on the fuse box.

Since the fuse box is provided on a section of the steering column and the operational switch is directly attached to the fuse box by means of the coupling terminals coupled to each other, a wire harness between the fuse box and the operation switch is eliminated so that the number of wire harnesses going in and out of the steering column section can be reduced greatly and the assembling work is mitigated.

Further, by providing the fuse box on the steering column section, the electrical system can be settled intensively to miniaturize and lighten the system and lower the cost.

In the above fuse apparatus for a vehicle, if an ignition switch is also directly attached to the fuse box with a coupling terminal of the ignition switch coupled to another coupling terminal provided on the fuse box and connected with a corresponding fuse, it is also unnecessary to connect the ignition switch and the fuse box with each other by a wire harness so that the number of wire harnesses disposed around the steering column can be reduced.

In the above fuse apparatus for a vehicle, if a changeover circuit for an operational switch is also provided on the fuse box, it is possible to miniaturize the operational switch, settle the circuit portion intensively and mitigate parts assembling work associated therewith.

Further, the fuse apparatus for a vehicle according to the invention, if the operational switch is for a lighting device, an operating section of the lighting device can be incorporated into the fuse box intensively.

Similarly, in to the fuse apparatus for a vehicle according to the invention, if the operational switch is for a wiper device, operating an section of the wiper device can be incorporated into the fuse box intensively.

Similarly, in the fuse apparatus for a vehicle according to the invention, if the operational switch is for a washer device, an operating section of the washer device can be incorporated into the fuse box intensively.

Similarly, in the fuse apparatus for a vehicle according to the invention, if the operational switch is for a winker device, an operating section of the winker device can be incorporated into the fuse box intensively.

Similarly, in the fuse apparatus for a vehicle according to the invention, if the operational switch is for a hazard device, an operating section of the hazard device can be incorporated into the fuse box intensively. Other objects, advantages and features of the invention will be apparent from the following detailed description which, in conjunction with the annexed drawings, describes the presently preferred embodiment of the invention.

DETAILED DESCRIPTION OF THE PREFERRED EMBODIMENT

Hereinafter a preferred embodiment of the present invention will be described with reference to FIGS. 1 and 2.

Figure 1:
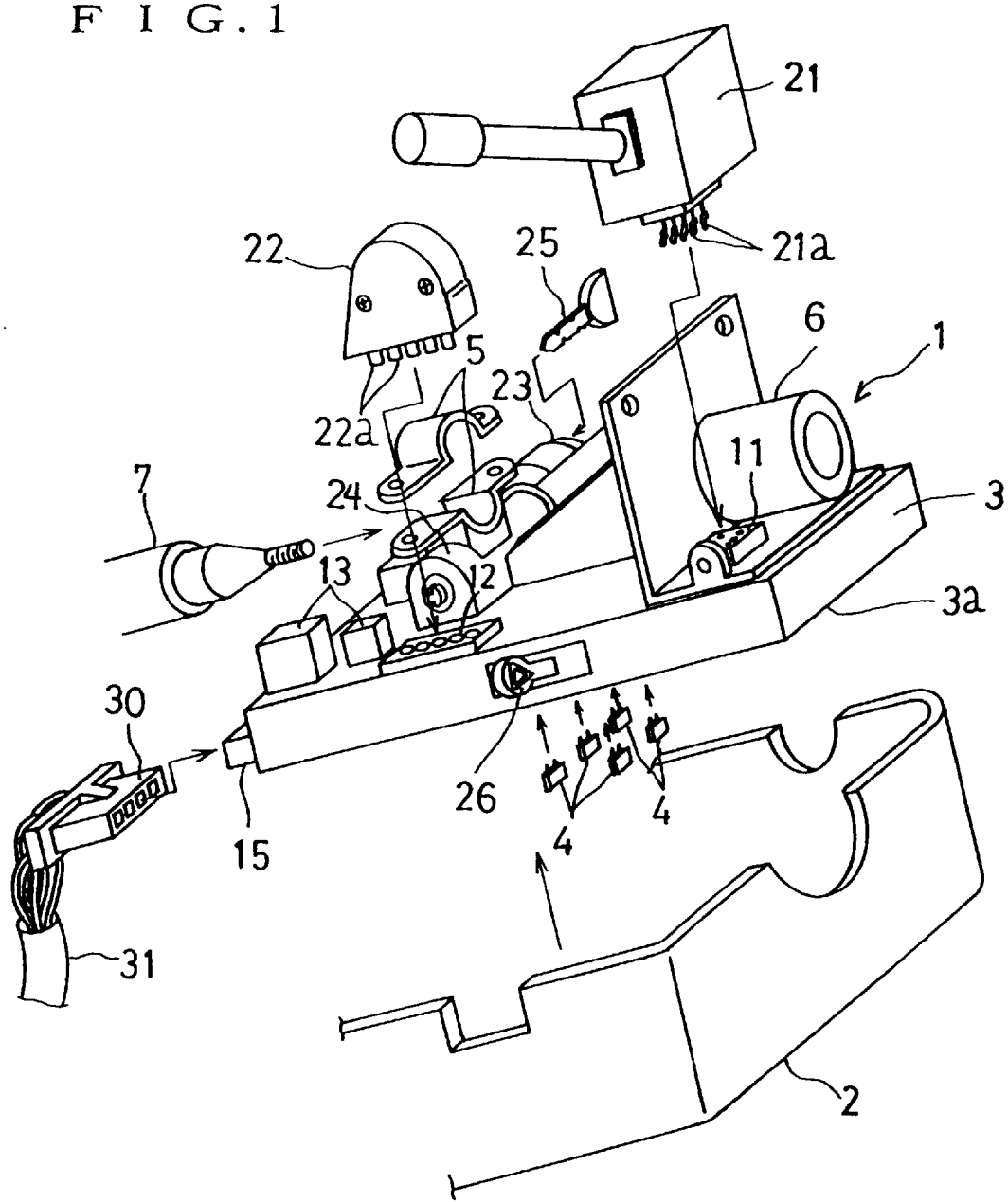
FIG. 1 is an exploded perspective view of a steering column section according to a preferred embodiment of the present invention.

FIG. 1 is an exploded perspective view of a steering column section 1 according to the embodiment. The steering column section 1 is covered by a column under cover 2 from the bottom and has a fuse box 3 housed within the cover.

The fuse box 3 is formed in a shape of a rectangular flat box and has a bottom plate 3a constituting a wiring base board for busbar and the like. Fuses 4 are inserted into the box 3 from the bottom to be fitted to coupling terminals provided on the wiring base board.

On an upper surface of the fuse box 3 are projected a steering lock 5 and a bearing 6 for pivotally supporting a steering shaft 7.

Various coupling terminals 11, 12 and a plurality of relays 13 are fixed on the fuse box 3 and connected with respective specific fuses or a connector 15 at an end of the fuse box 3 by printed wirings and busbars on the bottom plate 3a.

A wiper switch 21 is directly attached to the fuse box 3 with a coupling terminal 21a of the wiper switch 21 coupled to the coupling terminal 11 for electrical connection.

Similarly, an ignition switch 22 is directly attached to the fuse box 3 with a coupling terminal 22a of the ignition switch 22 coupled to the coupling terminal 12 of the fuse box 3.

On the upper surface of the fuse box 3 are provided an insertion section 23 for inserting a key 25 and a transmission section 24 for transmitting operational of the key to the ignition switch 22 so that the ignition switch 22 is driven by operating the key. In addition, a hazard switch 26 is also attached to the fuse box 3.

To the connector 15 is connected a corresponding connector 30 from which a wire harness 31 is extended.

The wire harness 31 includes signal lines going to operating sections of motors and lights from operational switches such as the wiper switch 21, the hazard switch 26 and the like, and an electrical power line connecting the ignition switch 22 to a main fuse which is disposed in an engine compartment together with a battery.

A lighting switch 27, a winker switch 28 and the like (FIG. 2) are also attached to the fuse box 3 though they are not shown in FIG. 1. Thus, by providing the fuse box 3 in the steering column section 1, an electrical system is constituted intensively.

Since the wiper switch 21, the hazard switch 26, the ignition switch 22 and the like are directly attached to the fuse box 3, and electrical connections are made by coupling between the coupling terminals 11, 21a and between the coupling terminals 12 and 22a, etc. traditional wire harnesses for connection between the fuse box and the operational switches become unnecessary so that the number of wire harnesses of the electrical system is reduced drastically.

Therefore, assembly work of the electrical system is also mitigated drastically and low cost, miniaturization and weight-lightening can be correspondingly achieved.

Further, since changeover circuits for the operational switches such as the relays 13 are also directly attached to the fuse box 3, electrical parts are concentrated still more on the steering column section 1 and parts assembling work is further mitigated.

Figure 2:
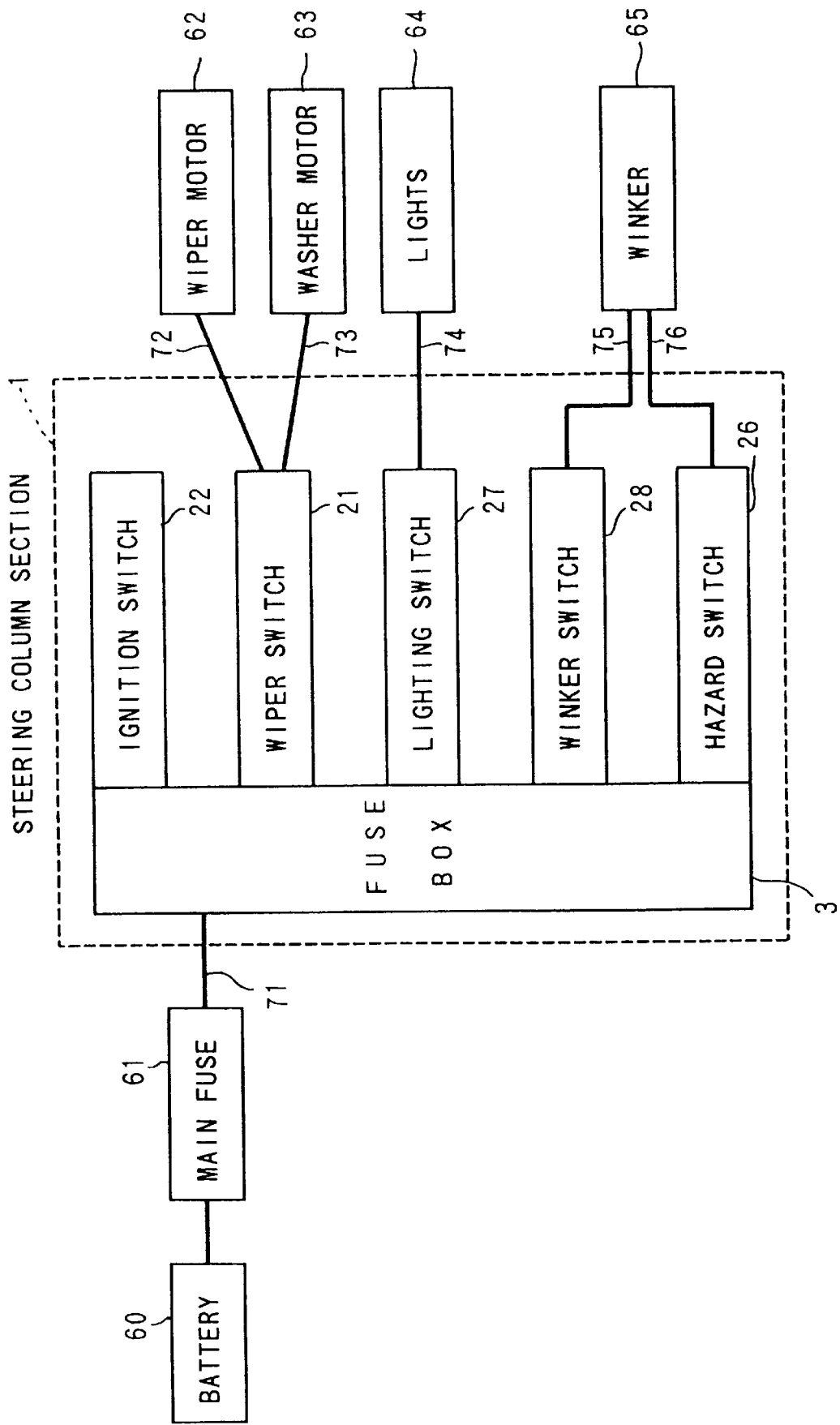
FIG. 2 is a rough block diagram of an electrical system according to the embodiment.
Figure 3:
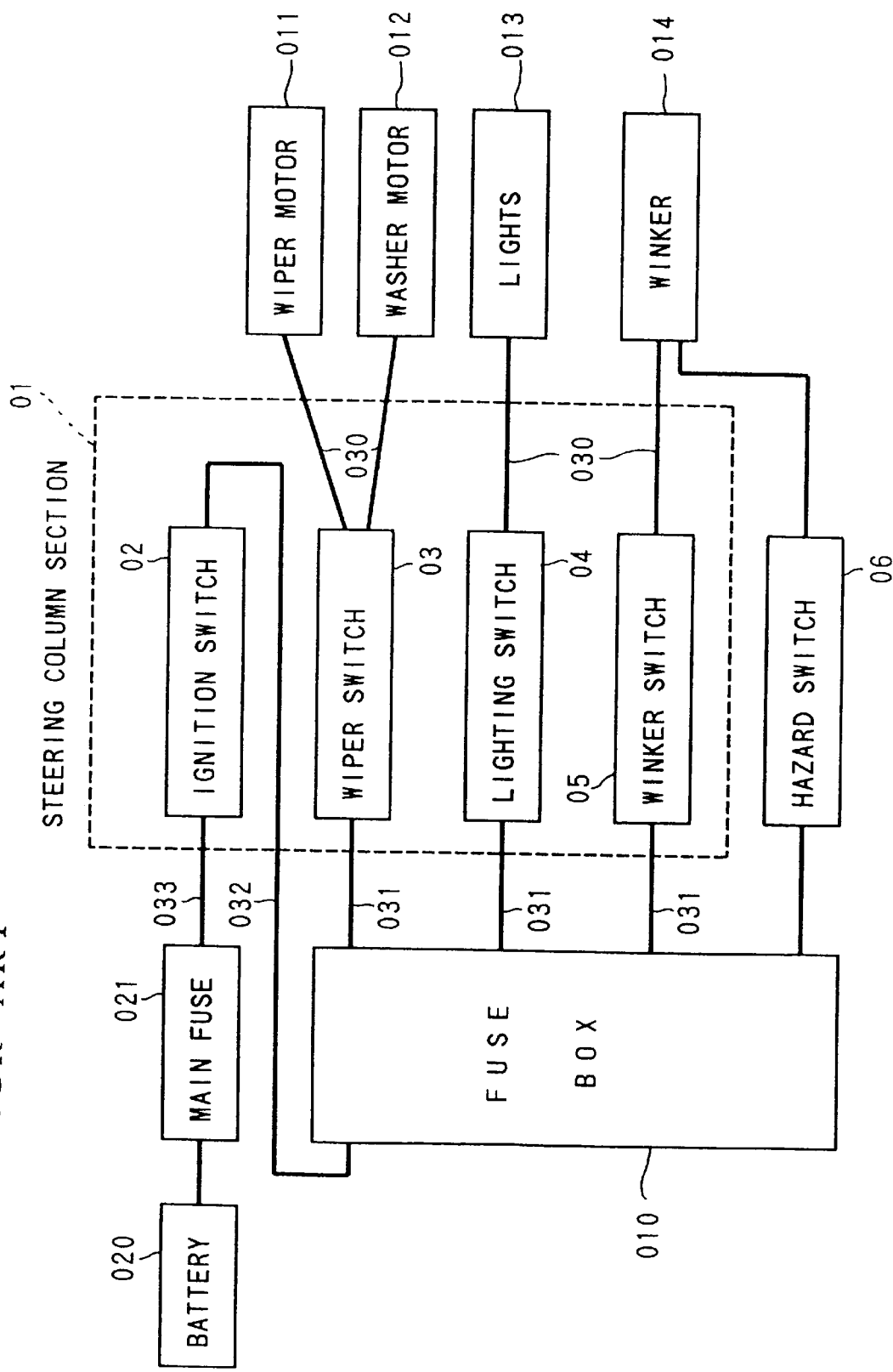
FIG. 3 is a rough block diagram of a conventional electrical system.

FIG. 2 is a rough block diagram of the electrical system according to the presently perferred embodiment.

The fuse box 3 is provided in the steering column section 1 and the ignition switch 22, the wiper switch 21, the lighting switch 27, the winker switch 28 and the hazard switch 26 are directly attached to the fuse box 3. These switches are connected to respective specific fuses by the wiring base board of the fuse box 3.

The ignition switch 22 is connected with a main fuse 61 in an engine compartment by a wire harness 71. Within the engine compartment, the main fuse 61 is connected with a positive terminal of a battery 60.

The wiper switch 21 is connected with a wiper motor 62 and a washer motor 63 by wire harnesses 72, 73, the lighting switch 23 is connected with various lights 64 by a harness 74 and the winker switch 28 and the hazard switch 26 are connected with a winker lamp 65 by wire harnesses 75, 76, respectively.

Wire harnesses going in and out of the steering column section 1 are limited to the wire harness 71 going in the ignition switch 52 from the main fuse 61 and wire harnesses 72, 73, 74, 75 and 76 going out of the operational switches 21, 27, 28 and 26 to the operating sections 62, 63, 64 and 65 and therefore, the number of wire harnesses is reduced extremely.

In the advancing automobile electrical systems of recent years, circuits and electrical parts tend to increase. However, by adopting the constitution of the present fuse apparatus, it is possible to avoid enlargement of the number of wire harnesses required therefor and to solve problems such as high cost, increased weight and increased labor in the assembling work. Although the preferred embodiment of the present invention has been described in detail above, it will be understood by persons skilled in the art that variations and modifications may be made thereto without departing from the gist, spirit or essence of the invention. The scope of the invention is indicated by the appended claims rather than by the foregoing description.

What is claimed is:

1. A fuse apparatus for a vehicle, comprising:

a fuse box provided on a steering column and having a fuse connected with an operational switch on said steering column; and a coupling terminal provided on said fuse box, connected with said fuse, said operational switch is directly attached to said fuse box with a coupling terminal of said switch coupled to said coupling terminal on said fuse box.

2. A fuse apparatus for a vehicle as claimed in claim 1, wherein an ignition switch is also directly attached to said fuse box with a coupling terminal of said ignition switch coupled to another coupling terminal provided on said fuse box and connected with a corresponding fuse of said fuse box.

3. A fuse apparatus for a vehicle as claimed in claim 1, wherein a changeover circuit for said operational switch is also provided on said fuse box.

4. A fuse apparatus for a vehicle as claimed in claim 1, wherein said operational switch is for a lighting device.

5. A fuse apparatus for a vehicle as claimed in claim 1, wherein said operational switch is for a wiper device.

6. A fuse apparatus for a vehicle as claimed in claim 1, wherein said operational switch is for a washer device.

7. A fuse apparatus for a vehicle as claimed in claim 1, wherein said operational switch is for a winker device.

8. A fuse apparatus for a vehicle as claimed in claim 1, wherein said operational switch is for a hazard device.

9. A fuse apparatus for a vehicle according to claim 1, wherein said fuse box includes a plurality of fuses and has a plurality of coupling terminals provided thereon, said coupling terminals of said fuse box are associated with corresponding ones of said fuses and have coupling terminals of a plurality of the operational switches provided on the steering column directly connected thereto.

10. A fuse apparatus for a vehicle according to claim 9, wherein said operational switches are for at least two of a lighting device, a wiper device, a washer device, a winker device, and a hazard warning device, respectively.

11. A fuse apparatus according to claim 1, wherein said fuse box further includes a plate with wirings and a busbar operatively disposed between said fuse and said coupling terminal provided on the fuse box.

12. Fuse apparatus for a vehicle, comprising:

a fuse box provided on a steering column of the vehicle;

said fuse box including a fuse operatively associated with an operational switch means also provided on the steering column, and a coupling terminal having a mating coupling terminal of the operational switch means directly connected thereto.

13. Fuse apparatus according to claim 12, wherein said fuse box includes a plurality of fuses and a plurality of said coupling terminals, said coupling terminals of said fuse box are associated with corresponding ones of said fuses and are directly connected to mating coupling terminals of a plurality of the operational switch means also provided on the steering column.

14. Fuse apparatus according to claim 13, wherein said fuse box further includes a plate with wiring and a busbar operatively disposed between the fuses and the coupling terminals of the fuse box.

* * * * *

UNITED STATES PATENT AND TRADEMARK OFFICE
CERTIFICATE OF CORRECTION

PATENT NO : 5,892,295
DATED : 06 April 1999
INVENTOR(S): Hitoshi Ohtsuka, Eiji Sakaguchi It is certified that error appears in the above-identified patent and that said Letters Patent is hereby corrected as shown below:

On the cover page, under "[30] Foreign Application Priority Data", change "8-292988" to --8-292998--.

Column 1, line 17, change "electrical" to --electric--;
line 61, after "concentrated" insert a comma.
Column 2, line 30, after "Further," insert --in--;
line 34, delete "to";
line 36, change "operating an" to --an operating--;
line numbered between 49 and 50, begin a new paragraph at the word "Other".
Column 3, line 25, change "operational" to --operation--;
line numbered between 35 and 36, change "electrical" to --electric--;

line numbered between 51 and 52, change "electrical" to --electric--;
line 61, change "perferred" to --preferred--.
Column 4, 7th line, change "23" to --27--;
line numbered between 17 and 18, between "and" and "therefore" insert a comma;
line numbered between 21 and 22, change "electrical" to --electric--;
line numbered between 24 and 25, after "therefor" insert a comma;
line numbered between 26 and 27, begin a new paragraph at the word "Although".

Signed and Sealed this

Seventeenth Day of August, 1999

Attest:

Q. TODD DICKINSON

*Attesting Officer*   *Acting Commissioner of Patents and Trademarks*